United States Patent
Ko

(10) Patent No.: US 9,306,669 B2
(45) Date of Patent: Apr. 5, 2016

(54) OPTIC DISTRIBUTED ANTENNA SYSTEM SUPPORTING MULTI-BAND MULTI-CARRIER SERVICE OVER A REDUCED NUMBER OF OPTIC CORE LINES

(71) Applicant: Advanced RF Technologies, Inc., Burbank, CA (US)

(72) Inventor: Young-Hoon Ko, Icheon (KR)

(73) Assignee: ADVANCED RF TECHNOLOGIES, INC., Burbank, CA (US)

(*) Notice: Subject to any disclaimer, the term of this patent is extended or adjusted under 35 U.S.C. 154(b) by 19 days.

(21) Appl. No.: 13/835,332

(22) Filed: Mar. 15, 2013

(65) Prior Publication Data

US 2014/0064730 A1    Mar. 6, 2014

Related U.S. Application Data

(60) Provisional application No. 61/694,196, filed on Aug. 28, 2012.

(51) Int. Cl.
*H04B 10/2575* (2013.01)

(52) U.S. Cl.
CPC ...... *H04B 10/2575* (2013.01); *H04B 10/25754* (2013.01)

(58) Field of Classification Search
CPC .................. H04B 10/2575; H04B 10/25754
USPC ................................................... 398/43, 67
See application file for complete search history.

(56) References Cited

U.S. PATENT DOCUMENTS

| | | | |
|---|---|---|---|
| 2009/0180407 A1* | 7/2009 | Sabat | H04B 10/25754 370/280 |
| 2011/0268449 A1* | 11/2011 | Berlin | H04B 10/25753 398/115 |
| 2012/0134666 A1* | 5/2012 | Casterline | H04B 10/25754 398/22 |

* cited by examiner

*Primary Examiner* — David Payne
*Assistant Examiner* — Omar S Ismail
(74) *Attorney, Agent, or Firm* — Lewis Roca Rothgerber Christie LLP

(57) ABSTRACT

An optic Distributed Antenna System includes a Head End (HE) configured to adjust a first signal for a first carrier at a first band to a first level, to adjust a second signal having at least a carrier different from the first carrier or a band different from the first band to a second level, to combine the first and second signals, to perform Electronic/Optic conversion on the combined signal, and to optic-distribute and send the combined optic signal, and a plurality of Remote Units (RUs) each connected to the HE over a corresponding single optic line, wherein each of the RUs is configured to perform Optic/Electronic conversion on the combined optic signal, to adjust the converted signal for each signal band, to perform high-power amplification on the adjusted signals, to multiplex the amplified signals, and to transmit the multiplexed signal to a Mobile station via at least one antenna.

20 Claims, 5 Drawing Sheets

OPTIC DISTRIBUTED ANTENNA SYSTEM SUPPORTING MULTI-BAND MULTI-CARRIER SERVICE OVER A REDUCED NUMBER OF OPTIC CORE LINES

CROSS-REFERENCE TO RELATED APPLICATION(S)

The present application claims the benefit of U.S. Provisional Patent Application Ser. No. 61/694,196, filed Aug. 28, 2012, the contents of which are hereby incorporated by reference in their entirety.

BACKGROUND

1. Field

Embodiments of the present invention relate generally to an optic Distributed Antenna System (DAS), and, more particularly, to an optic DAS which is capable of supporting a multi-band, multi-carrier service, rather than a single band or single carrier service, over a single or reduced number of optic core lines.

2. Description of Related Art

A Distributed Antenna System (DAS) is a system which amplifies and sends signals from a Base Transceiver Station (BTS), so that the signals can reach Radio Frequency (RF) shadow zones in areas where radio waves cannot typically be transmitted, such as areas in a large building, a campus, a stadium, a hospital, or a tunnel. In an opposite direction, the system also functions to amplify signals of a terminal in the RF shadow zone, and to send those signals to the BTS.

In a typical optic DAS, a Head End (HE) unit adjusts an RF signal connected to a Base Transceiver Station (BTS)/Bi-Directional Amplifier (BDA) in a wired connection to an appropriate level for each band or each carrier, performs Electronic/Optic (E/O) conversion and optic distribution for each band or each carrier, and sends the RF signal to a Remote Unit (RU) over an optic line. For the purpose of illustration, FIG. 1 shows a configuration of an optic DAS which supports two bands or carriers, in which two optic lines are connected to each RU, and four RUs are provided, therefore requiring eight optic lines. If desired, an HE may be connected to a different number of RUs over a different number of optic lines in order to support a larger number of bands or carriers.

The conventional technology requires a plurality of optic lines for each RU in order to support a multi-band, multi-carrier service. Accordingly, as the number of bands or carriers increases, the number of optic lines for each RU increases. Furthermore, as the number of optic lines increases, a risk of failing in the provision of service because of an error in connecting the optic lines increases. Additionally, there arise problems in that the system construction costs, optic line deployment costs, and operating costs increase, and the operating efficiency deteriorates.

SUMMARY OF INVENTION

There is therefore a desire for an optic Distributed Antenna System (DAS) which is capable of supporting a multi-band multi-carrier service over a single or a reduced number of core optic lines.

Accordingly, embodiments of the present invention have been made, keeping in mind the above problems occurring in the conventional art, where an object of the present invention is to provide an optic DAS which is capable of providing a multi-band, multi-carrier service over a single or reduced number of core optic lines, while being able to perform gain control and monitoring for each band, and gain control and monitoring for each carrier.

In one exemplary embodiment, an optic DAS includes a Head End (HE) configured to adjust a first downlink signal for a first carrier at a first band to a first level, to adjust a second downlink signal having at least a carrier different from the first carrier or a band different from the first band to a second level, to combine the first and second downlink signals, to perform Electronic/Optic (E/O) conversion on the combined downlink signal, and to optic-distribute and send the combined downlink optic signal, and a plurality of Remote Units (RUs) each respectively connected to the HE over a corresponding single optic line, wherein each of the RUs is configured to perform Optic/Electronic (O/E) conversion on the combined downlink optic signal, to adjust the converted downlink signal for each signal band, to perform high-power amplification on the adjusted downlink signals, to multiplex the amplified downlink signals, and to transmit the multiplexed downlink signal to a Mobile station (MS) via at least one antenna.

The optic DAS may be further configured such that the RUs are further configured to perform low-noise amplification on uplink signals received from an MS, to adjust the amplified uplink signals for each signal band, to combine the adjusted uplink signals, to perform E/O conversion on the combined uplink signal, and to transmit the converted combined uplink signal in an optic form to the HE, and wherein the HE is further configured to perform O/E conversion on the converted combined uplink signals transmitted from each of the plurality of RUs, to adjust the converted uplink electronic signal for each signal band, and to transmit the adjusted uplink electronic signals to corresponding base transceiver stations/bi-directional amplifiers (BTSs/BDAs).

The HE may include a band combine unit corresponding to each respective band configured to interface the downlink signals from one or more base transceiver stations/bi-directional amplifiers (BTSs/BDAs) for one or more corresponding carriers, to adjust the downlink signals, and to transmit the downlink signals to corresponding RF units, and to adjust the uplink electronic signals input from the corresponding RF units, and to send the adjusted uplink electronic signals to BTSs/BDAs for the corresponding carriers, the RF Units corresponding to respective bands and coupled to a corresponding BTS/BDA or band combine unit for the respective bands, the RF Units configured to adjust the downlink signals received from the corresponding BTS/BDA or band combine units, and to filter and transmit the downlink signals to multi-way Channel Combiner Units, and to adjust uplink electronic signals received from the multi-way channel combiner units, and to filter and transmit the adjusted uplink electronic signals to the corresponding BTS/BDA or band combine unit, the multi-way channel combiner units configured to combine the downlink signals received from the RF units, to split the received downlink signals, and to transmit the received downlink signals to optic distribution units, and to combine the uplink electronic signals from the optic distribution units, to split the uplink electronic signals, and to transmit the uplink electronic signals to the RF units, the optic distribution units configured to adjust the downlink signals received from the multi-way channel combiner units, to perform E/O conversion on the received downlink signals, and to optically expand and transmit the downlink optic signals to the RUs, and to perform O/E conversion on the uplink signals optically received from the RUs, to adjust the uplink electronic signals, and to combine and transmit the uplink electronic signals to the multi-way channel combiner units, and a network monitoring system configured to monitor and control the band combine unit, the RF units, and the optic distribution units, to communicate with remote control units corresponding to each of the RUs connected to the HE, and to monitor and control the RUs connected to the HE.

Each of the RUs may include an optic remote unit configured to perform O/E conversion on the combined downlink optic signal from the HE, to adjust the converted downlink signal, and to send the adjusted downlink signal to a multi-way combiner, and to amplify an uplink signal input from the multi-way combiner at a corresponding gain, to perform E/O conversion on the uplink signal, and to send the converted uplink signal to the HE over an optic line, the multi-way combiners configured to split the adjusted downlink signal from the optic remote unit, and to send the split downlink signals to remote access units corresponding to the respective bands, and to combine the amplified uplink signals input from the remote access units corresponding to the respective bands, and to send the combined uplink signal to the optic remote unit, the remote access units corresponding to respective bands configured to adjust corresponding ones of the split downlink signals input from the multi-way combiner, to filter and high-power amplify the corresponding split downlink signal, and to send the amplified downlink signal to a duplexer, and to low-noise amplify uplink signals from the duplexer corresponding to the respective bands, to adjust the amplified uplink signals, to filter the amplified uplink signals, and to send the amplified uplink signals to the multi-way combiner, the duplexers corresponding to the respective bands configured to filter the amplified downlink signals input from the remote access units, to duplex the amplified downlink signals, and to send the amplified downlink signals to a multiplexer, and to duplex corresponding uplink signals input from a channel multiplexer, to filter the uplink signals, and to send the uplink signals to the corresponding remote access unit, the channel multiplexer connected to the duplexers configured to multiplex the amplified downlink signals input from the duplexers and to transmit the multiplexed downlink signals to the one or more antennas, and to de-multiplex the uplink signals input from the one or more antennas, and to transmit the de-multiplexed signals to corresponding ones of the duplexers, and a remote control unit configured to monitor and control the optic remote unit and the remote access units, and to communicate with the HE.

The HE may be configured to detect at least one of attachment or detachment, bands, or installation information of the respective components of the HE, and to provide status information on the respective components of the HE, to detect installation information corresponding to each of the RUs coupled to the HE, and to provide status information based on the installation information via the control screen, to provide at least one of connection status, optical information, or loss information corresponding to each optic line coupled between the HE and the respective RUs, to download firmware for the respective components of the HE and the RUs, and/or to perform status checks and control the HE and the RUs while a user is communicating with the optic DAS from a remote location.

Each of the RUs may be configured to detect at least one of attachment or detachment, bands, or installation information of the respective components of the RU, and to provide status information on the respective components of the RU, and/or to perform at least one of status checks or control of the RU from a location of the RU remote from the HE, and to perform at least one of status checks or control of the HE connected to the RU.

The HE and the RUs may be configured to support a multiple-input and multiple-output (MIMO) system.

BRIEF DESCRIPTION OF DRAWINGS

The above and other aspects, features and advantages of the present invention will be more clearly understood from the following detailed description of exemplary embodiments, taken in conjunction with the accompanying drawings, in which.

DETAILED DESCRIPTION

Figure 1:
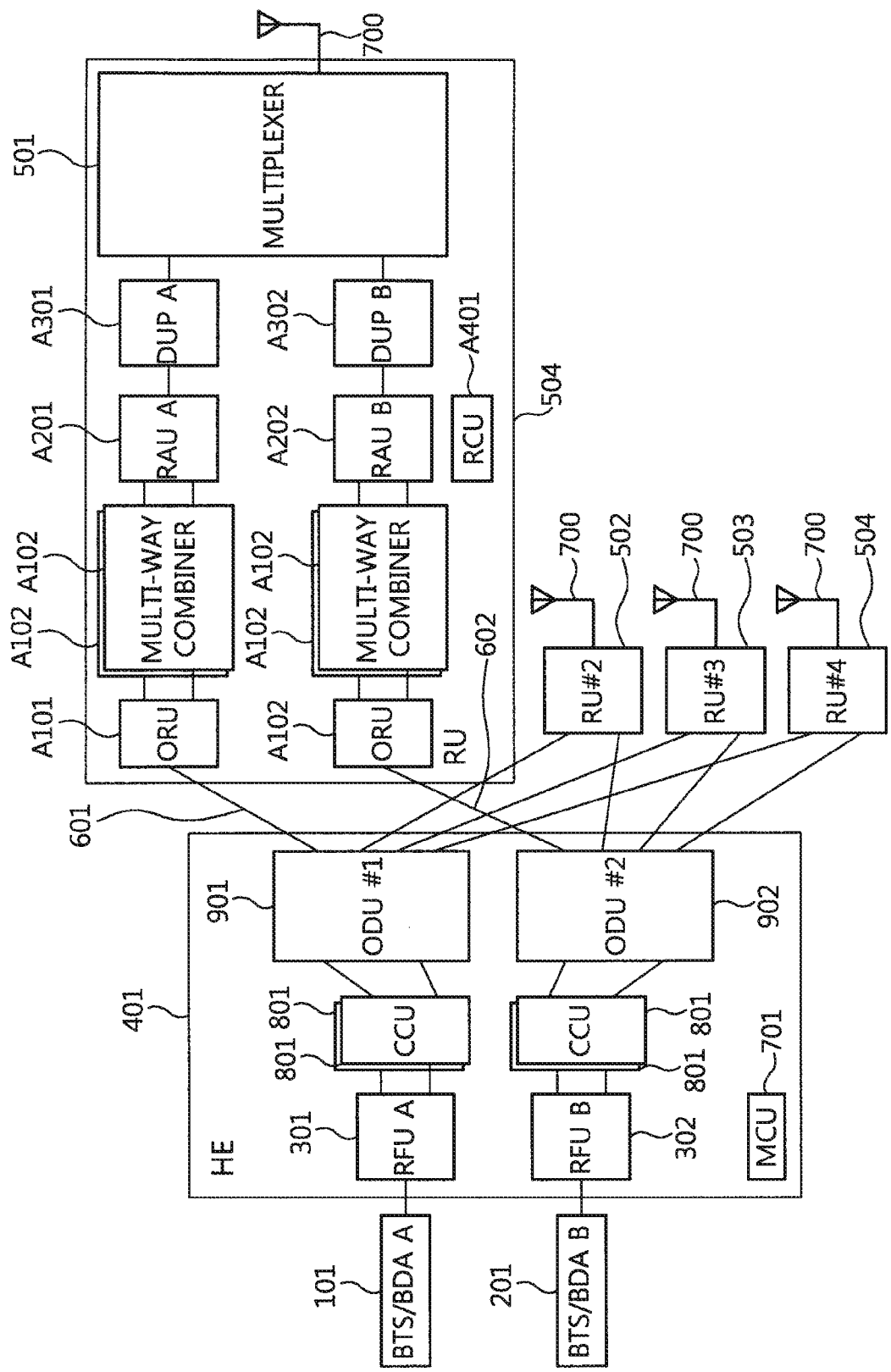
FIG. 1 is a diagram showing a configuration of a typical optic Distributed Antenna System (DAS) supporting two bands and two carriers.

Reference is now made to the drawings, throughout which the same reference numerals are used to designate the same or similar components.

Exemplary embodiments of the present invention will be described in detail below with reference to the accompanying drawings.

FIG. 1 shows a typical optic Distributed Antenna System (DAS) supporting two bands and two carriers.

Figure 2:
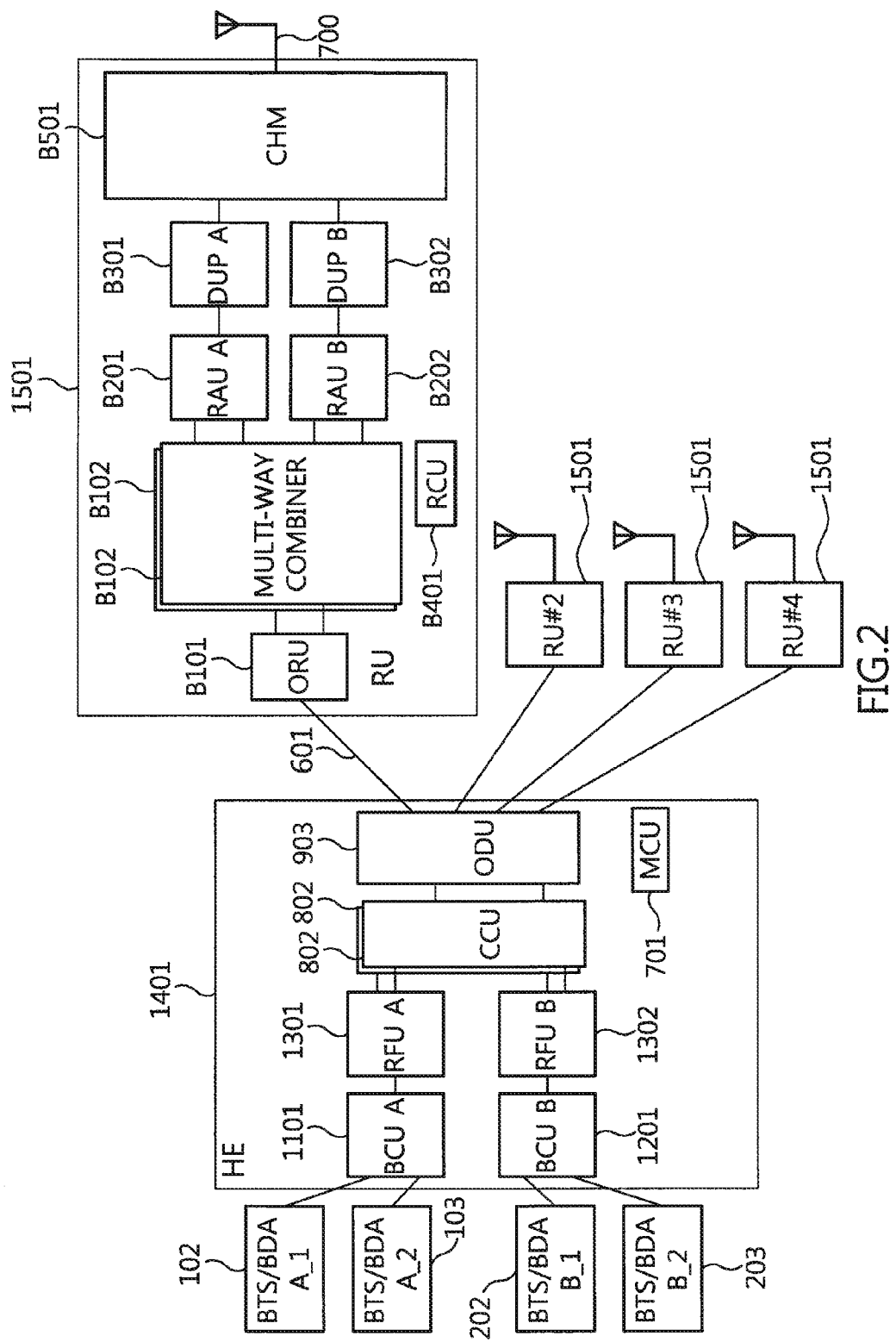
FIG. 2 is a diagram showing a configuration of an optic DAS supporting two bands and two carriers according to an embodiment of the present invention.

In contrast, FIG. 2 shows an optic DAS supporting two bands and two carriers according to an embodiment of the present invention.

The head end (HE) unit 1401 of the embodiment in FIG. 2 RE-interfaces with base transceiver systems/bi-directional amplifiers (BTSs/BDAs) 102, 103, 202, and 203 corresponding to two bands and two carriers per band, and is connected to remote units (RUs) 1501 via optic lines, and functions to distribute signals to the RUs 1501 by optical distribution. Each of the RUs 1501 is connected to the HE 1401 via a single optic core line, for example, line 601, and can send signals to a mobile station (MS) (not shown) and receive signals from the MS via an antenna 700.

Figure 3:
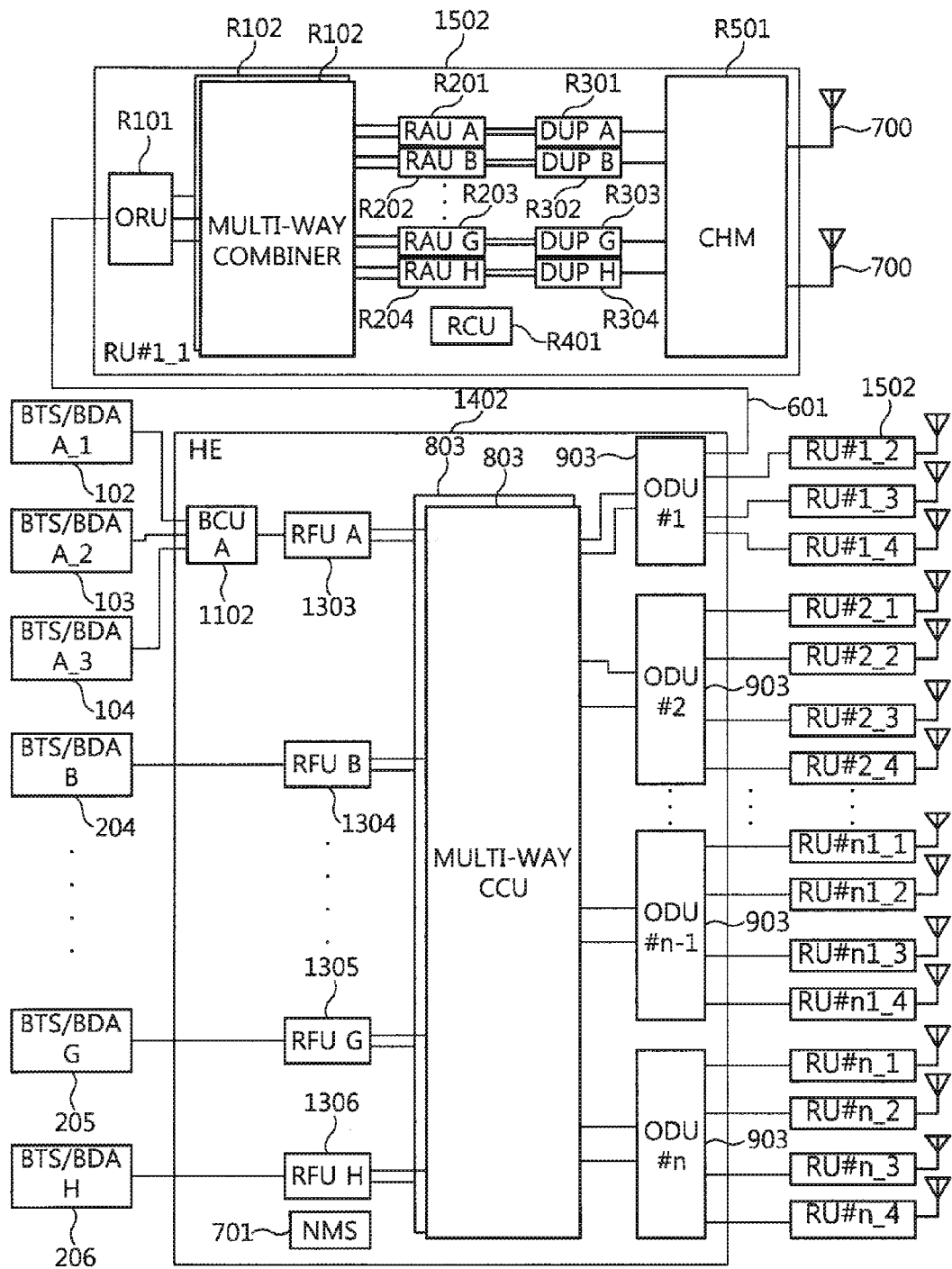
FIG. 3 is a diagram showing a configuration of an optic DAS supporting a multi-band and a multi-carrier according to another embodiment of the present invention.

FIG. 3 shows a more complex configuration of an optic DAS, supporting multiple bands and multiple carriers, according to an embodiment of the present invention.

As shown in FIG. 3, the DAS according to an embodiment of the present invention includes an HE 1402 and a plurality of optically distributed RUs 1502.

As shown in FIG. 3, the HE 1402 includes a number of different features or components.

In the HE 1402, as an example, a band combine unit 1102 is configured to interface with BTSs/BDAs 102, 103, and 104 for the same band and different carriers, to perform adjustment and monitoring at respective appropriate gains for the carriers, and to perform sending signals to an RFU 1303 for the same band.

RF Unit 1303 is configured to interface with the band combine unit 1102, while RF Units 1304, 1305, and 1306 are configured to interface directly with the BTSs/BDAs 204, 205, and 206. In other embodiments, any number of BCUs can be implemented in a similar fashion.

Meanwhile, multi-way channel combiner units 803 in the HE 1402 are configured to combine and split the signals of the RF units 1303, 1304, 1305, and 1306 for respective bands.

Finally, optic distribution units 903 in the HE 1402 are configured to adjust multi-band, multi-carrier signals received from the multi-way channel combiner units 803 to appropriate levels, to perform electronic/optic (E/O) conversion on the adjusted signals, and to distribute the signals among a plurality of optic lines.

A network monitoring system 701 located in the HE 1402 is configured to monitor and control the band combine unit 1102, the RF units 1303, 1304, 1305, and 1306 and the optic distribution units 903 included in the HE 1402, to monitor the status of the optic lines 601 connected to the RUs 1502, and to monitor and control the RUs 1502 connected to the HE 1402.

The RF units 1303, 1304, 1305, and 1306 each contains an RF unit Controller, which may monitor and control the RF units 1303, 1304, 1305, and 1306 and communicate with the network monitoring system 701.

The optic distribution units 903 may each include a Wavelength Division Multiplexer (WDM; not shown), and may concurrently (e.g., simultaneously) send downlink signals and uplink signals over a single optic core line.

The optic distribution units 903 may each further include an optic distribution unit Controller, and may perform RF and optic monitoring and control on the optic distributor unit 903 and communicate with the network monitoring system 701.

The network monitoring system 701 may detect attachment and detachment of bands and installation information of the units installed in the HE 1402, and may provide status information based on the installation information, for example, on a control screen.

Furthermore, the network monitoring system 701 may download firmware for each of the units or components installed in the HE 1402.

Each of the RUs 1502 includes an Optic Remote Unit R101 connected to the optic distribution unit 903 via a single optic core line 601, that is configured to perform O/E conversion, perform adjustment at appropriate gains, and perform sending to a multi-way combiner R102. The multi-way combiner R102 is configured to combine multi-band signals input from the Optic Remote Unit R101, to split a resulting signal in multiple ways, and to send corresponding resulting signals to a plurality of Remote Access Units R201, R202, R203, and R204, and to combine signals for respective bands input from the plurality of Remote Access Units R201, R202, R203, and R204, and send resulting signals to the optic remote unit R101. The remote access units R201, R202, R203, and R204 are configured to adjust signals input from the multi-way combiner R102 at appropriate gains for respective bands, filter the adjusted signals, perform high-output amplification on the filtered signals, and then send the amplified signals via an antenna, and to perform low-noise amplification on signals input from an MS, filter the amplified signals, adjust the filtered signals to appropriate levels, and then send the adjusted signals to the multi-way channel combiner R102. Duplexers R301, R302, R303, and R304 are configured to interface with corresponding ones of the remote access units R201, R202, R203, and R204, and to duplex downlink signals and uplink signals. A Channel Multiplexer R501 is configured to multiplex the multi-band signals into a single optic line and to perform a connection to, for example, a plurality of antennas. A remote control unit R401 is configured to monitor and control the RU 1502, and to communicate with the network monitoring system 701 of the HE 1402. A remote access unit controller installed in each of the remote access units R201, R202, R203, and R204 monitors and controls the respective remote access units R201, R202, R203 and R204.

The optic remote unit R101 may contain a Wavelength Division Multiplexer (WDM; not shown), and may concurrently (e.g., simultaneously) send a downlink signal and an uplink signal over a single optic core line.

Although the channel multiplexer R501 is illustrated as being connected to either a single antenna or two antennas, as examples, channel multiplexers in other embodiments may be configured to be connected to one or more antennas, for example, using a multi-way combiner (not shown) contained in the channel multiplexer R501.

The channel multiplexer R501 may be configured to perform distribution in multiple ways, for example, using a method using a cavity type, a method of constructing a matrix structure using a hybrid coupler, a method using a Wilkinson type, or a method using a combination thereof, and to be connected to a plurality of antennas.

Figure 5:
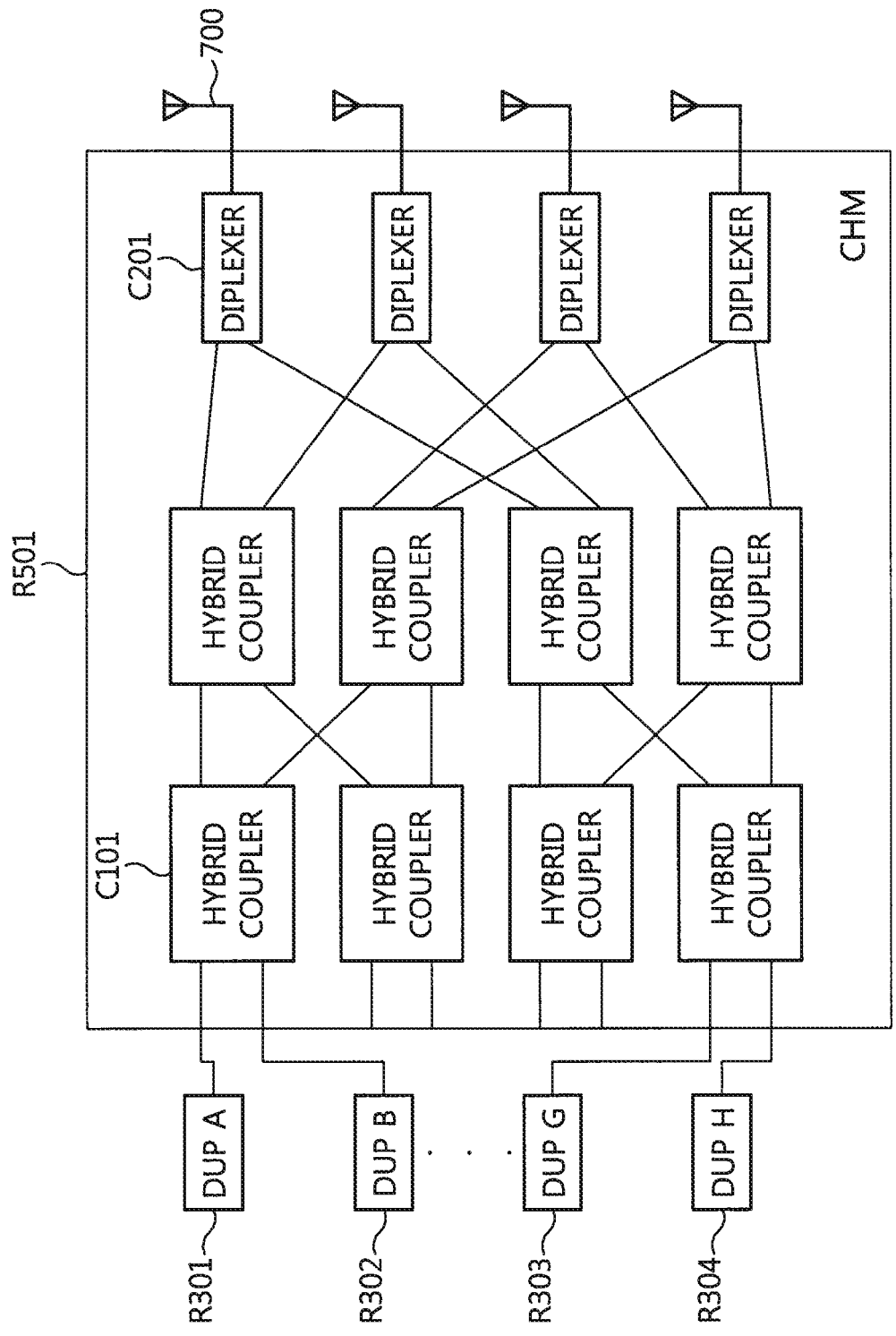
FIG. 5 is a diagram showing a configuration of a channel multiplexer according to an embodiment of the present invention.

FIG. 5 is a diagram showing a channel multiplexer R501 of the optic DAS according to an embodiment of the present invention. In this drawing, the hybrid couplers C 101 are configured in a matrix structure.

The remote control unit R401 may perform status checks and control the RU 1502 after the user has established a connection thereto from the site of the RU 1502 via, for example, a Graphic User Interface (GUI), and may download firmware for each of the units installed in the RU 1502.

The remote control unit R401 further may perform status checks and control the HE 1402, which is optically connected with the RU 1502 by the user from the site of the RU 1502 via a GUI.

Figure 4:
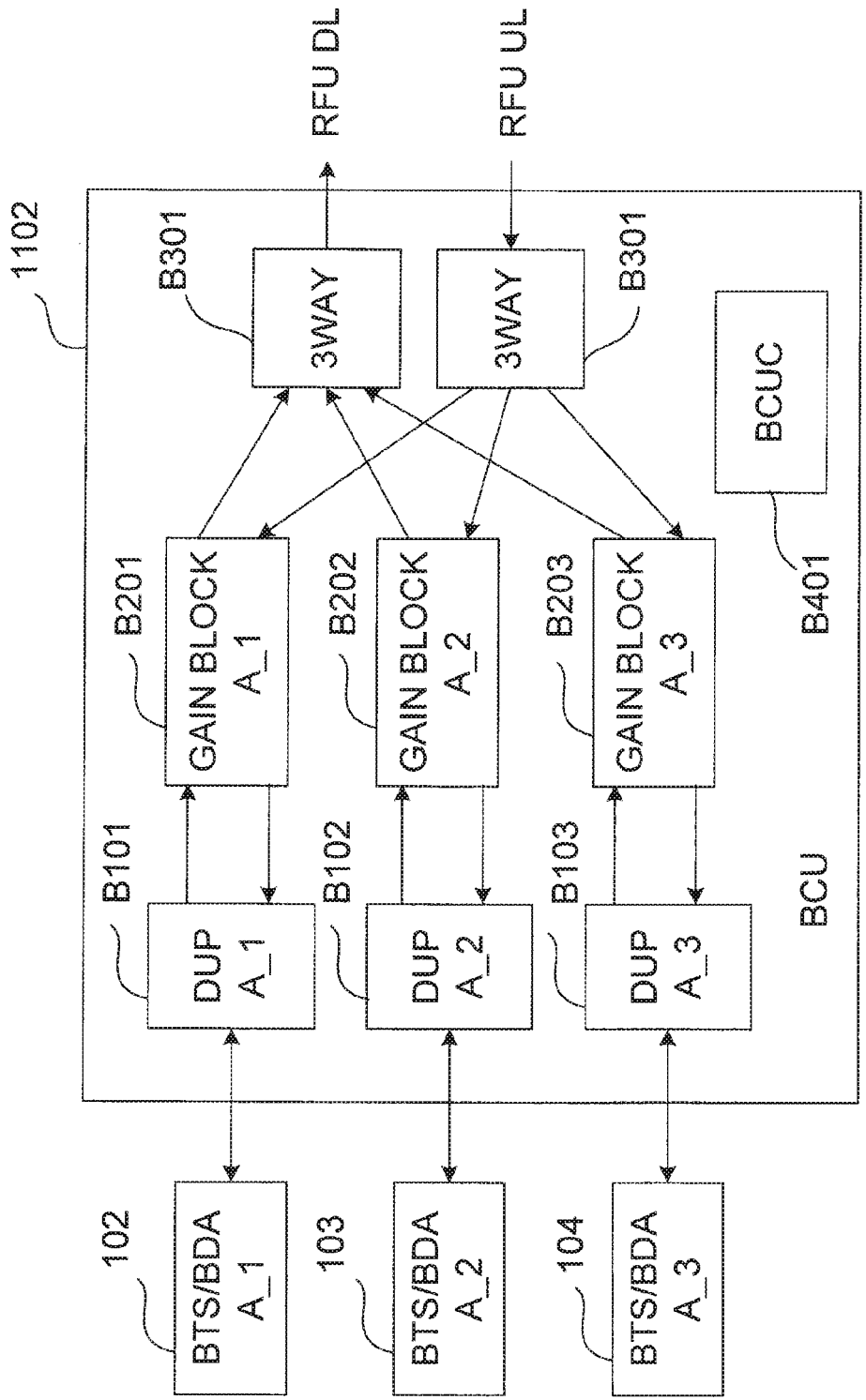
FIG. 4 is a diagram showing a configuration of a band combine unit according to an embodiment of the present invention.

FIG. 4 shows an internal configuration of a band combine unit 1102 according to an embodiment of the invention.

Duplexers B101, B102, and B103 for respective carriers are correspondingly connected to BTS/BDA A_1 102, BTS/BDA A_2 103, and BTS/BDA A_3 104 for the same band being used by the different carriers, and is configured to function to distinguish downlink signals and uplink signals from each other.

Gain blocks B201, B202 and B203 connected to the duplexers B101, B102, and B103, are configured to adjust the downlink signals for respective carriers at appropriate gains, and then send the downlink signals to 3WAY combiners B301, and to adjust uplink signals input from the 3WAY combiners B301 at appropriate gains, and then send the adjusted uplink signals to the duplexers B101, B102, and B103, respectively.

The 3WAY combiners B301 are configured to combine downlink signals for respective carriers input from the gain blocks B201, B202, and B203 into a single signal, and to split the uplink signals input from the RF units 1303, 1304, 1305, and 1306, and then send the uplink signals to the gain blocks B201, B202 and B203.

A band combine unit controller B401 is configured to monitor and control the levels of signals for respective carriers input and output to and from the band combine unit 1102.

Although three carriers are shown in FIG. 4, different numbers of carriers may be applied using a different number of duplexers, a different number of gain blocks, and different multi-way combiners, each including a different number of ways.

Furthermore, in embodiments of the present invention, it may be possible to provide multi-band and multi-carrier service using the band combine unit 1102 for respective bands, to provide multi-carrier services for different respective bands, while still using a single optical core line between the HE 1402 and each of the RUs 1502.

A variety of communication methods, including serial communication such as RS485, and Ethernet communication, may be used as a method of communication between the units installed in the HE 1402 and the network monitoring system.

A variety of communication methods, including serial communication such as RS485, and Ethernet communication, may also be used as a method of communication between the units installed in each of the RUs 1502 and the remote control unit R401.

The user may connect with the network monitoring system 701 using a separate Ethernet or Web GUI from a remote location when he or she cannot directly connect a GUI to the site of the HE 1402, while the network monitoring system 701 may perform the status check and control of the HE 1402 and the RUs 1502, and separately download firmware for each of the units installed in the HE 1402 and the RUs 1502.

The network monitoring system 701 enables the user to store the set parameters of each of the units installed in the HE 1402 and the RUs 1502 in the form of a file using a GUI, and the user may check the stored file using, for example, an additional program.

The optic DAS according to embodiments of the present invention may provide a Multiple Input Multiple Output (MIMO) service using the band combine unit 1102, the RF units 1303, 1304, 1305, and 1306, the optic distribution units 903, and the multi-way channel combiner units 803 included in the HE 1402, and the optic remote units R101, the multi-way combiners R102, the remote access units R201, R202, R203, and R204, and the duplexers R301, R302, R303, and R304 included in the RU 1502.

The optic DAS according to embodiments of the present invention may support mobile communication standards being used all over the world and in Air interface protocols. By way of example, the optic DAS may support frequencies ranging from VHF to a few GHz. The optic DAS may support protocols, including Advanced Mobile Phone System (AMPS), Time Division Multiple Access (TDMA), Global System for Mobile communications (GSM), Code Division Multiple Access (CDMA), Integrated Digital Enhanced Network (IDEN), Worldwide Interoperability for Microwave Access (WIMAX), Long Term Evolution (LTE), Wideband Code Division Multiple Access (WCDMA), public safety, General Packet Radio Service (GPRS), Enhanced Data GSM Environment (EDGE), and paging protocols, among others. The optic DAS may support 1G, 2G, 3G, 4G standards, as well as various other mobile technology generational services that may be developed in the future.

The optic DAS according to embodiments of the present invention is further configured such that each of the units of the HE 1402 and the RUs 1502 may be attached and detected in the form of a single body, so that addition of a band or a carrier, and management of the bands and the carriers, are more readily facilitated.

In accordance with embodiments of the present invention, the following advantages, among others, can be realized.

First, embodiments of the present invention have an advantage of reducing installation costs and operating costs, and increasing efficiency of operation and maintenance, because multiple bands and multiple carriers are connected to each of the RUs via a single or reduced number of optic core lines.

Second, embodiments of the present invention have an advantage of eliminating or reducing the risk of misconnection, which may occur when a connection is made to each of the RUs using a plurality of optic core lines, because in the above embodiments, a connection is made to each of the RUs via a single or reduced number of optic core lines to provide a multi-band, multi-carrier service.

The above descriptions of embodiments of the present invention are only for the purpose of illustration, and it will be understood by those having ordinary knowledge in the technical field to which the present invention pertains that modifications and variations can be easily made without departing from the scope and technical spirit of the present invention. Therefore, it should be appreciated that the above-described embodiments are illustrative in every aspect, and is not intended to be limiting. For example, an element which has been described as being in a single form may be practiced in a distributed form, and similarly, elements which have been described as being distributed may be practiced in a combined form.

The scope of the present invention is defined by the following claims, and it is to be appreciated that all modifications and variations derived from the meanings and scope of the claims and equivalents thereof are intended to fall within the scope of the present invention.

What is claimed is:

1. An optic Distributed Antenna System (DAS) for supporting mobile communications, the optic DAS comprising:
    a Head End (HE) configured to adjust a first downlink signal for a first carrier at a first band to a first signal level, to adjust a second downlink signal having at least a carrier different from the first carrier or a band different from the first band to a second signal level different from the first signal level, to combine the first and second downlink signals, to perform Electronic/Optic (E/O) conversion on the combined downlink signal, and to optic-distribute and send the combined downlink optic signal; and
    a plurality of Remote Units (RUs) each respectively connected to the HE over a corresponding single optic line, wherein each of the RUs is configured to receive the combined downlink optic signal from the HE via the corresponding single optic line, to perform Optic/Electronic (O/E) conversion on the combined downlink optic signal, to adjust the converted downlink signal for each signal band, to perform high-power amplification on the adjusted downlink signals, to multiplex the amplified downlink signals, to transmit the multiplexed downlink signal to a Mobile station (MS) via at least one antenna, to receive uplink signals transmitted from the MS, to adjust the uplink signals into a converted combined uplink signal, and to transmit the converted combined uplink signal in an optic form to the HE via the corresponding single optic line;
    wherein the RUs are configured to adjust the uplink signals into a converted combined uplink signal by performing low-noise amplification on uplink signals received from an MS, adjusting the amplified uplink signals for each signal band, combining the adjusted uplink signals, and performing E/O conversion on the combined uplink signal;
    wherein the HE is further configured to perform O/E conversion on the converted combined uplink signals transmitted from each of the plurality of RUs, to adjust the converted uplink electronic signal for each signal band, and to transmit the adjusted uplink electronic signals to corresponding base transceiver stations/bi-directional amplifiers (BTSs/BDAs); and
    wherein the HE comprises:
        a band combine unit corresponding to each respective band configured to interface the downlink signals from one or more base transceiver stations/bi-directional amplifiers (BTSs/BDAs) for one or more corresponding carriers, to adjust the downlink signals, and to transmit the downlink signals to corresponding RF units, and to adjust the uplink electronic signals input from the corresponding RF units, and to send the adjusted uplink electronic signals to BTSs/BDAs for the corresponding carriers;

the RF Units corresponding to respective bands and coupled to a corresponding BTS/BDA or band combine unit for the respective bands, the RF Units configured to adjust the downlink signals received from the corresponding BTS/BDA or band combine units, and to filter and transmit the downlink signals to multi-way Channel Combiner Units, and to adjust uplink electronic signals received from the multi-way channel combiner units, and to filter and transmit the adjusted uplink electronic signals to the corresponding BTS/BDA or band combine unit;

the multi-way channel combiner units configured to combine the downlink signals received from the RF units, to split the received downlink signals, and to transmit the received downlink signals to optic distribution units, and to combine the uplink electronic signals from the optic distribution units, to split the uplink electronic signals, and to transmit the uplink electronic signals to the RF units;

the optic distribution units configured to adjust the downlink signals received from the multi-way channel combiner units, to perform E/O conversion on the received downlink signals, and to optically expand and transmit the downlink optic signals to the RUs, and to perform O/E conversion on the uplink signals optically received from the RUs, to adjust the uplink electronic signals, and to combine and transmit the uplink electronic signals to the multi-way channel combiner units; and a network monitoring system configured to monitor and control the band combine unit, the RF units, and the optic distribution units, to communicate with remote control units corresponding to each of the RUs connected to the HE, and to monitor and control the RUs connected to the HE.

2. The optic DAS of claim 1, wherein each of the optic distribution units comprises a wavelength division multiplexer (WDM), and wherein the HE is respectively connected to each of the RUs over only a single corresponding optic line.

3. The optic DAS of claim 1, wherein the HE further comprises:

a band combine unit Controller configured to communicate with the network monitoring system and to monitor and control the band combine units;

an RF unit Controller configured to communicate with the network monitoring system and to monitor and control the RF units; and an optic distribution unit controller configured to communicate with the network monitoring system and to monitor and control the optic distribution units.

4. The optic DAS of claim 3, wherein the band combine unit controller, the RF unit controller, and the optic distribution unit controller communicate with the network monitoring system utilizing at least one of RS485, other serial communication, or Ethernet communication.

5. An optic Distributed Antenna System (DAS) for supporting mobile communications, the optic DAS comprising:

a Head End (HE) configured to adjust a first downlink signal for a first carrier at a first band to a first signal level, to adjust a second downlink signal having at least a carrier different from the first carrier or a band different from the first band to a second signal level different from the first signal level, to combine the first and second downlink signals, to perform Electronic/Optic (E/O) conversion on the combined downlink signal, and to optic-distribute and send the combined downlink optic signal; and a plurality of Remote Units (RUs) each respectively connected to the HE over a corresponding single optic line, wherein each of the RUs is configured to receive the combined downlink optic signal from the HE via the corresponding single optic line, to perform Optic/Electronic (O/E) conversion on the combined downlink optic signal, to adjust the converted downlink signal for each signal band, to perform high-power amplification on the adjusted downlink signals, to multiplex the amplified downlink signals, to transmit the multiplexed downlink signal to a Mobile station (MS) via at least one antenna, to receive uplink signals transmitted from the MS, to adjust the uplink signals into a converted combined uplink signal, and to transmit the converted combined uplink signal in an optic form to the HE via the corresponding single optic line;

wherein the RUs are configured to adjust the uplink signals into a converted combined uplink signal by performing low-noise amplification on uplink signals received from an MS, adjusting the amplified uplink signals for each signal band, combining the adjusted uplink signals, and performing E/O conversion on the combined uplink signal;

wherein the HE is further configured to perform O/E conversion on the converted combined uplink signals transmitted from each of the plurality of RUs, to adjust the converted uplink electronic signal for each signal band, and to transmit the adjusted uplink electronic signals to corresponding base transceiver stations/bi-directional amplifiers (BTSs/BDAs); and wherein each of the RUs comprises:

an optic remote unit configured to perform O/E conversion on the combined downlink optic signal from the HE, to adjust the converted downlink signal, and to send the adjusted downlink signal to a multi-way combiner, and to amplify an uplink signal input from the multi-way combiner at a corresponding gain, to perform E/O conversion on the uplink signal, and to send the converted uplink signal to the HE over an optic line;

the multi-way combiners configured to split the adjusted downlink signal from the optic remote unit, and to send the split downlink signals to remote access units corresponding to the respective bands, and to combine the amplified uplink signals input from the remote access units corresponding to the respective bands, and to send the combined uplink signal to the optic remote unit;

the remote access units corresponding to respective bands configured to adjust corresponding ones of the split downlink signals input from the multi-way combiner, to filter and high-power amplify the corresponding split downlink signal, and to send the amplified downlink signal to a duplexer, and to low-noise amplify uplink signals from the duplexer corresponding to the respective bands, to adjust the amplified uplink signals, to filter the amplified uplink signals, and to send the amplified uplink signals to the multi-way combiner;

the duplexers corresponding to the respective bands configured to filter the amplified downlink signals input from the remote access units, to duplex the amplified downlink signals, and to send the amplified downlink signals to a multiplexer, and to duplex corresponding uplink signals input from a channel multiplexer, to filter the uplink signals, and to send the uplink signals to the corresponding remote access unit;

the channel multiplexer connected to the duplexers configured to multiplex the amplified downlink signals input from the duplexers and to transmit the multiplexed downlink signals to the one or more antennas, and to de-multiplex the uplink signals input from the one or more antennas, and to transmit the de-multiplexed signals to corresponding ones of the duplexers; and a remote control unit configured to monitor and control the optic remote unit and the remote access units, and to communicate with the HE.

6. The optic DAS of claim 5, wherein each of the optic remote units comprises a wavelength division multiplexer (WDM), and wherein the HE is respectively connected to each of the RUs over only a single corresponding optic line.

7. The optic DAS of claim 5, wherein the duplexers are coupled to the one or more antennas via the channel multiplexer or are directly coupled to the one or more antennas.

8. The optic DAS of claim 5, wherein the channel multiplexer comprises a cavity, a hybrid coupler, or a Wilkinson divider, and is directly coupled to the one or more antennas.

9. The optic DAS of claim 5, wherein each of the RUs further comprises a remote access unit controller configured to communicate with the remote control unit and to monitor and control the remote access units.

10. The optic DAS of claim 9, wherein the remote access unit controller communicates with the remote control unit utilizing at least one of RS485, other serial communication, or Ethernet communication.

11. The optic DAS of claim 1, wherein the HE is configured to detect at least one of attachment or detachment, bands, or installation information of the respective components of the HE, and to provide status information on the respective components of the HE.

12. The optic DAS of claim 1, wherein the HE is configured to detect installation information corresponding to each of the RUs coupled to the HE, and to provide status information based on the installation information via the control screen.

13. The optic DAS of claim 1, wherein the HE is configured to provide at least one of connection status, optical information, or loss information corresponding to each optic line coupled between the HE and the respective RUs.

14. The optic DAS of claim 13, wherein the HE is further configured to detect information about the connections between the HE and the RUs, to store installation and status information of the HE and installation and status information of each of the RUs coupled to the HE, and to check status of each of the RUs coupled to the HE.

15. The optic DAS of claim 1, wherein the HE is configured to download firmware for the respective components of the HE and the RUs.

16. The optic DAS of claim 1, wherein the HE is configured to perform status checks and control the HE and the RUs while a user is communicating with the optic DAS from a remote location.

17. The optic DAS of claim 5, wherein each of the RUs is configured to detect at least one of attachment or detachment, bands, or installation information of the respective components of the RU, and to provide status information on the respective components of the RU.

18. The optic DAS of claim 5, wherein each of the RUs is configured to perform at least one of status checks or control of the RU from a location of the RU remote from the HE, and to perform at least one of status checks or control of the HE connected to the RU.

19. The optic DAS of claim 5, wherein the HE and the RUs are configured to support a multiple-input and multiple-output (MIMO) system.

20. The optic DAS of claim 1, wherein the HE and the RUs are configured to support a multiple-input and multiple-output (MIMO) system.

\* \* \* \* \*